Patented Jan. 1, 1924.

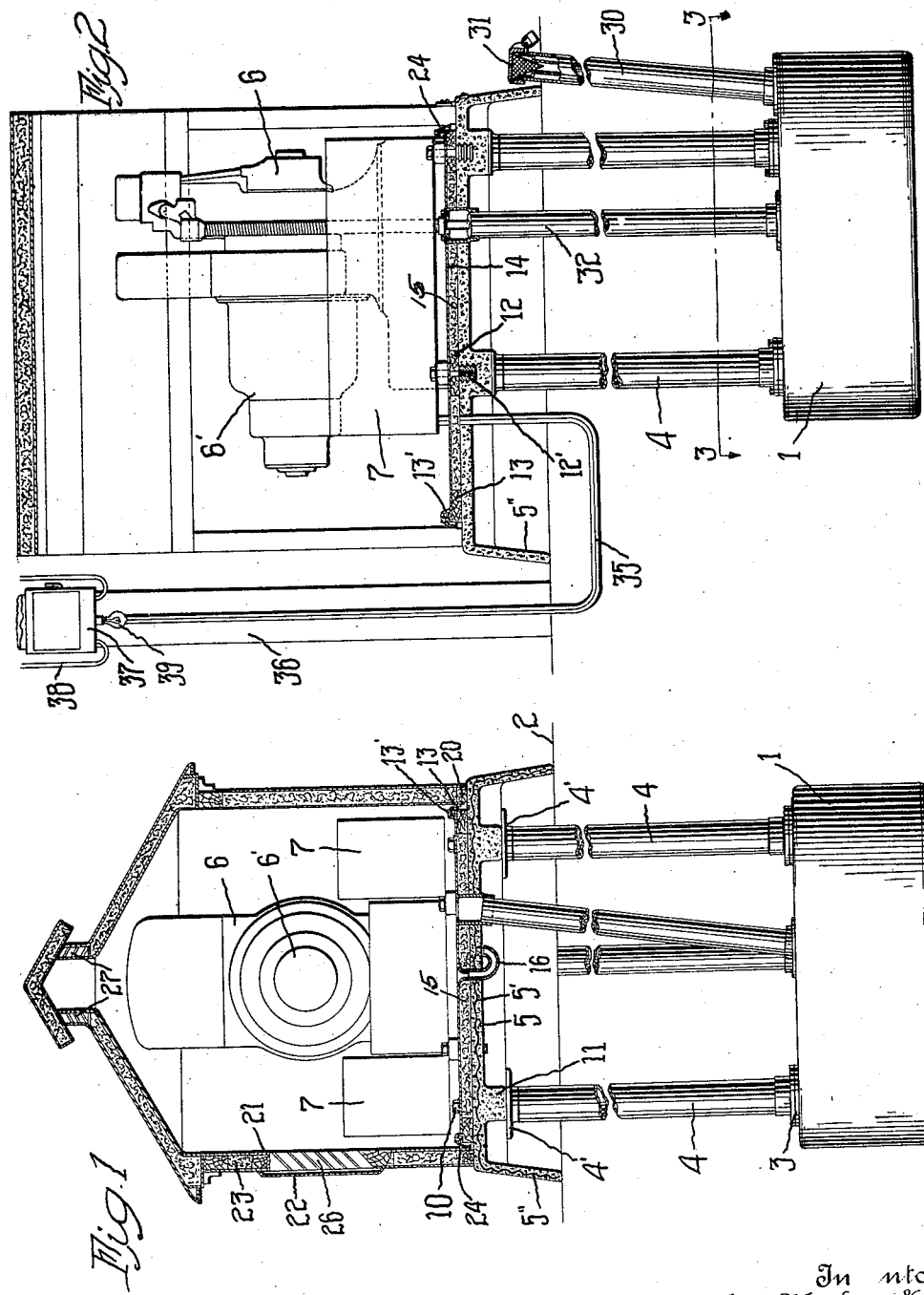

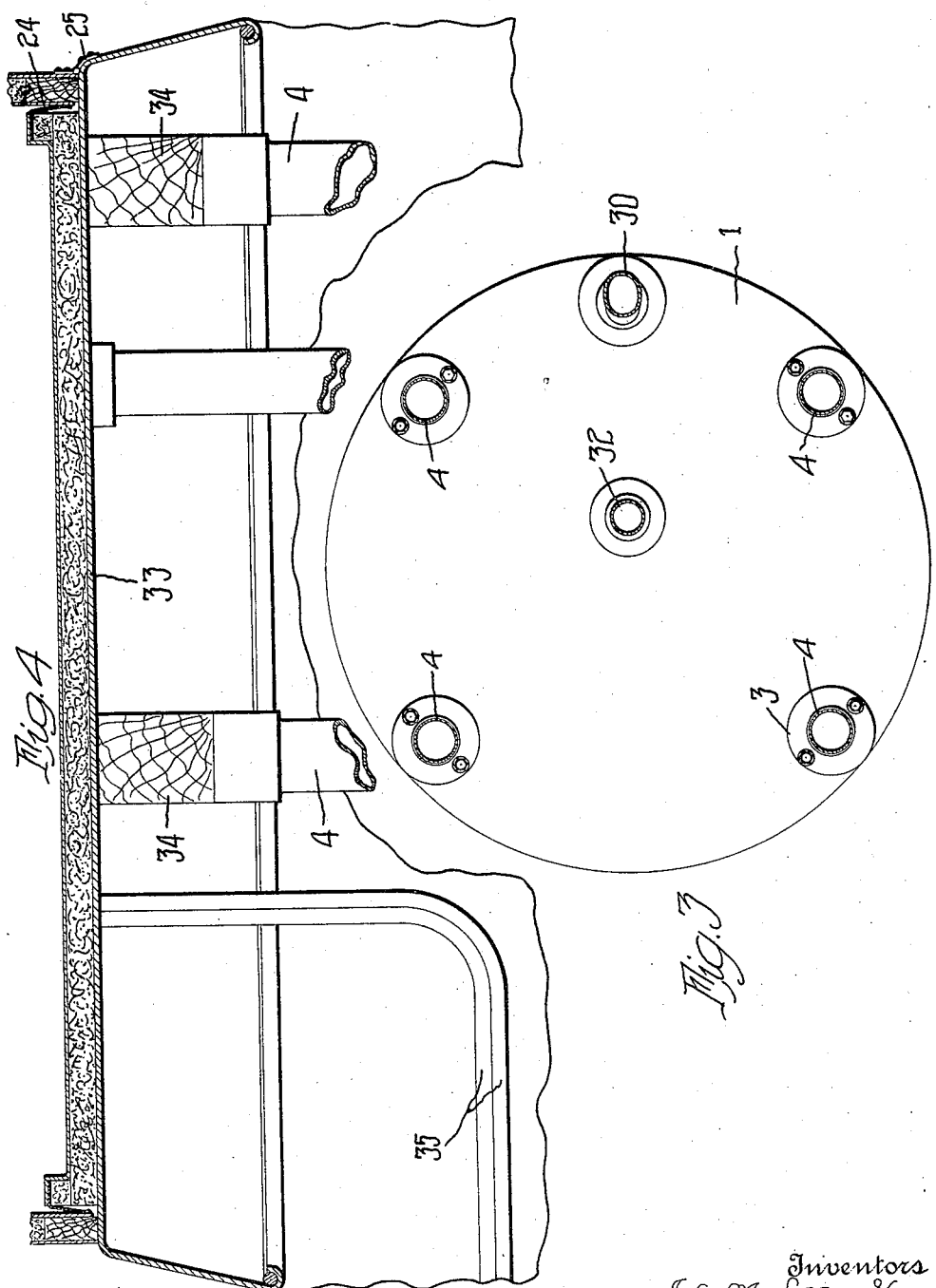

1,479,433

UNITED STATES PATENT OFFICE.

JOHN M. LEA AND JONATHAN P. B. FISKE, OF DETROIT, MICHIGAN, ASSIGNORS TO DELCO-LIGHT COMPANY, OF DAYTON, OHIO, A CORPORATION OF DELAWARE.

POWER UNIT.

Application filed September 8, 1919. Serial No. 322,598.

*To all whom it may concern:*

Be it known that we, JOHN M. LEA and JONATHAN P. B. FISKE, both citizens of the United States, and residents of Detroit, county of Wayne, and State of Michigan, have invented certain new and useful Improvements in Power Units, of which the following is a full, clear, concise, and exact description, such as will enable others skilled in the art to which the invention relates to make and use the same, reference being made therein to the accompanying drawings, which form a part of this specification.

The present invention relates to power units of the hydro-carbon engine electric-generator type, more particularly to those relatively small units which are intended primarily for use on farms, or elsewhere under similar conditions, for the generation of electricity for lighting or power.

A leading object is to provide a foundation or support for the engine and associated parts and a pipe connection between the engine and the fuel tank so constructed as to be readily installed without the services of a plumber, pipe fitter or mason. With this in view we employ the fuel tank as the foundation and manufacture the pipe connections to a uniform pattern, whereby when the tank is buried in the ground in accordance with the insurance regulations and the pipes connected up, a substantial, inexpensive support is afforded. Thus all parts used in the apparatus may be completed in the shop, and the necessity for cutting or threading pipes at the time of installation is avoided.

Another object is to provide a housing for the operative parts of the power unit whereby they are amply protected from rain, snow and dust and whereby the heat generated in the engine is conserved to tend to maintain the battery, carburetor, and other sensitive apparatus at a safe temperature. In the preferred construction, this housing is made detachable from its floor so that it may readily be removed to permit inspection of the engine and other apparatus. The invention is also concerned with various details of the floor for the engine housing whereby a neat heat-insulating enclosure for the upper ends of the risers or posts is secured and whereby said posts are braced to form a more stable support.

The invention further consists in certain other details of construction and relationships of parts hereinafter pointed out.

The invention also provides a desirable arrangement of tank filling means with reference to the engine housing so that it is not necessary to detach the housing when the fuel is to be replenished.

Fig. 1 is a part end elevation, part section showing a preferred embodiment of the invention. Fig. 2 is a side view corresponding thereto, parts being broken away. Fig. 3 is a horizontal section on line 3—3 of Fig. 2. Fig. 4 is a fragmentary vertical section corresponding to Fig. 2 and showing a modification.

1 indicates a fuel tank, as shown cylindrical—buried on end below the ground level 2 in accordance with insurance rules regulating the storage of gasoline or the like. The capacity of the tank is preferably quite large, say a barrel or more, and according to the better practice the top of the tank should be at least three feet below the surface. In the preferred construction, the tank has bolted or otherwise secured thereto along the margin of its upper end seats 3 which are adapted to receive the lower ends of corresponding tubular posts 4 the upper ends of which project somewhat above the ground. The tank and uprights together constitute a foundation which is capped in some suitable manner to form a floor 5 on which the engine 6 and generator 6', the batteries 7 and other associated mechanism and apparatus is supported. As one example of a desirable construction, the floor is shown as formed of a cementitious slab reinforced throughout by a metal fabric 5' and having the down-turned edges or skirting 5" whereby the upper ends of the posts are concealed, and whereby a dead air space for heat-insulating the floor from the ground is secured. By so positioning the parts that the edges 5" bear on the ground added stability is, of course, secured. Various forms of connections may be used for attaching the floor to the posts, such, for example, as the metal caps 4 and the cap screws 10 which pass through the longitudinal ribs or beam elements 11 on the lower side of the floor. It will be seen that this type of foundation may be quickly installed by unskilled labor, and without the use of cement.

In order to properly heat-insulate the apparatus from the floor, it is preferred to employ suitable spacing strips 12 secured in place by means of lag screws 12' (that may serve also for anchoring the motor-generator unit in place) and suitable centering strips 13 together with a sheet metal cover 14 and a filling 15 of asbestos or the like; it is also desirable to form raised margins 13' on the centering strips and to provide within the corresponding enclosure a suitable drainage trap 16 for water or other liquid.

Mounted, preferably loosely, on the floor around the centering strips is a housing which is preferably of the heat insulating type, built up from suitable framing 20 and inner and outer metal linings 21—22 packed with asbestos 23 or the like to form side walls, end walls and a roof. By spacing the housing slightly from the centering strips and by providing the downwardly and outwardly extending sealing strips 24 on the outside of the centering strips, as best indicated in Fig. 4, it is evident that an efficient sealing action against dust, rain or snow may be secured and that moisture dripping down the inner surface of the walls will be deflected away from the raised portion of the floor. Should it be desired to examine the engine or other apparatus, it is merely necessary to tilt the housing about suitable hinges 25, the sealing action being substantially automatic when the housing is returned—in other words very little care is necessary in positioning the housing.

Through the medium of inlet and outlet openings indicated diagrammatically at 26 and 27, air for cooling and ventilating is supplied, it being understood that the engine is preferably, although not necessarily, of the air cooled type.

The tank may be filled through any suitable connection, such as the pipe 30, the cap 31 of which is preferably positioned exterior to the housing, and the engine takes fuel through the piping 32.

An alternative floor construction appears in Fig. 4, wherein the metal reinforced element 5 is replaced by a pressed metal member 33 of the same general shape between which and the posts 4 wooden stringers 34 are interposed.

Current from the apparatus is preferably taken off through the medium of cables enclosed in lead pipes 35 which lead downwardly through the floor and pass underground to a pole 36 up which they rise to a junction box 37 where they communicate with service wires 38. A signal in the form of a lamp 39 may be provided at the box for an obvious purpose.

It will be evident that the various details may be modified within wide limits without departing from the scope of the invention. We believe, moreover, that we are the first to perceive the simplifying influence which flows from the mounting of the engine and associated parts on the buried fuel tank, and desire to claim this construction broadly regardless of the particular details employed. Again the generator and batteries might obviously be omitted, the engine being connected by belting or in any other suitable manner to a pump or to such other apparatus as it may be desired to drive.

We claim:—

1. In a power plant, a fuel tank, posts resting on the tank and projecting upwardly therefrom, and an internal combustion engine supporting structure mounted on the projecting ends of said posts.

2. In a power plant, a fuel tank buried below ground level, a plurality of tubular posts connected with the tank and projecting upwardly therefrom, and an engine supporting floor structure resting on said posts.

3. In a power plant, a fuel tank buried below ground level, a supporting structure mounted on the tank and projecting above said ground level, and a flooring enclosing and concealing the projecting portion of said structure and itself serving as a support for an internal combustion engine.

4. In a power plant, an internal combustion engine, and a unitary combined fuel tank and foundation therefor constructed separately therefrom.

5. In a power plant, a fuel tank buried below ground level, an internal combustion engine, a floor on which said engine is carried, said floor being itself carried on the fuel tank and forming on its under side a dead air space whereby it is heat-insulated from the ground.

6. In a power plant, a fuel tank buried below ground level and having supporting devices extending upwardly therefrom to points above the ground level, a floor carried by the upper ends of said devices and including a skirting whereby said devices are concealed and whereby a dead air space for insulating the floor from the ground is provided, and an engine supported on the floor and arranged to take fuel from the tank.

7. In a power plant, a tank buried below ground level, an engine supporting and enclosing structure mounted on the tank, and a filling pipe for the tank having an opening exterior to said structure.

8. In a power plant, a tank buried below ground level, an engine supporting and enclosing structure comprising a floor supported by the tank and a housing movable as a whole in respect to the floor to expose the engine for inspection.

9. In a power plant, a tank buried below ground level, an engine supporting and enclosing structure comprising a floor supported by the tank and a housing detachable as a whole from the floor to expose the engine for inspection.

10. In a power plant, a tank buried below ground level, a floor structure supported by the tank, an internal combustion engine carried by the floor structure, and an enclosure for the sides, ends and top of said engine movable in respect to the floor to permit free access to the engine.

11. In a power plant, an engine-supporting floor including centering means disposed around the outer edge portion thereof, a detachable housing mounted thereon and enclosing the engine, said housing being positioned by the centering means.

12. In a power plant, an engine supporting floor including a centering element arranged along the outer edge portion thereof to form a ledge, and a detachable housing mounted on the floor and extending down over said ledge, said housing enclosing the engine and being centered by the centering means.

13. In apparatus of the class described, a floor structure adapted to carry an engine, a movable housing adapted to enclose said engine and meeting the floor by a downwardly offset joint, and a sealing strip interposed between the inner face of the housing and an adjacent surface of the floor at the joint.

14. In a power plant, a floor structure forming at its under side a dead air space and supporting an engine, said structure having a raised margin extending around the engine, a housing for the engine centered by said margin, and a trap passing through the floor adapted to discharge liquid from the space within the housing into the dead air space.

15. In a power plant, a cementitious floor structure forming a dead air space in its lower side, a fuel tank below the floor structure, connections extending from the tank to said structure to support the latter, spacing strips disposed along the upper face of the floor structure, and an engine carried by the floor structure and anchored by devices which pass through said strips.

16. A power plant comprising in combination, an internal-combustion engine, a supporting structure therefor comprising marginal flanges extending downwardly therefrom, and a separate fuel tank secured to the underside of said supporting structure.

17. In a power plant, in combination, an internal-combustion engine, and means for supporting the same comprising a hollow structure having downwardly extending flanges adapted to bear on the ground and a fuel tank underneath said hollow structure and adapted to be detachably secured thereto.

In testimony whereof, we have signed our names to this specification this 29th day of August, 1919.

JOHN M. LEA.
JONATHAN P. B. FISKE.